3,702,360
METHOD OF CONTROLLING INSECTS ON ANIMALS WITH ORGANOTIN COMPOUNDS
Dell Derek Paul Graham, Balgowlah, New South Wales, Australia, assignor to M & T Chemicals (Australia) Pty. Limited, Unanderra, New South Wales, Australia
No Drawing. Filed May 23, 1969, Ser. No. 827,148
Claims priority, application Australia, May 23, 1968, 38,234/68
Int. Cl. A61k 27/00; A61l 23/00
U.S. Cl. 424—288          5 Claims

ABSTRACT OF THE DISCLOSURE

This invention is directed to an insect parasiticidal composition for the control and elimination of insect parasites living on or in the fleeces and/or hides of domestic animals, comprising as active ingredient at least one member selected from the group consisting of organotin compounds.

---

This invention relates to an insecticidal composition and process for the control and elimination of insect parasites such as, for example, keds, ticks, lice and blow flies living on or in the fleece and/or hide of animals, in particular sheep and cattle.

Insect parasites of the aforementioned kind constitute a serious problem to the economy of the animal husbandry industry and in particular to the health and well being of animals.

For example some parasites such as lice, *Damalinia ovis*, Linognathus spp, Haematopinus spp and ked, *Melophagus ovinus*, are a source of irritation to the affected animals and through rubbing, and biting result in a poorer quality fleece or hide and through interference with feeding lowered production. For example certain species of blow flies, *Lucilia cuprina*, Chrysomyia spp, may under certain conditions lay their eggs in the fleece of sheep which on hatching and subsequent development cause a condition known as "fly strike." This may result in the death of animals if left untreated and in all cases result in loss of or depreciation in the value of the wool.

For example infestations with cattle tick *Boophilus microplus* may also result in death of animals through loss of blood or tick worry or at least lowered body weight gain in beef animals and lowered milk production in dairy cattle.

In an effort to control these parasites, various compositions involving the use of arsenic, chlorinated hydrocarbons, organophosphates and carbamates have been made available commercially. The use of chlorinated hydrocarbons have been recently prohibited because of tissue residue problems. More recently strains of sheep blow fly, *Lucilia cuprina* have shown tolerance to organophosphates and carbamates used for their control and strains of the cattle tick, *Boophilus microplus* have also shown varying degrees of tolerance to arsenic preparations and organophosphates and carbamates. Higher concentrations are required to obtain effective control of these parasites resulting in increased cost and possible toxic effects.

Furthermore, the compositions comprising the aforementioned compounds as active ingredients suffer from the disadvantage that they have a relatively short effective life in the wool fibre of fleece-bearing animals and treatment thereof must therefore be effected at relatively short regular intervals to control the insect parasite condition.

It is thus the principal object of this invention to provide a new class of compounds which may be used for the control and elimination of existing strains of the important insect parasites of domestic animals.

It is another object of this invention to provide a composition for the treatment of the aforementioned insect parasite condition, comprising an active ingredient having greater persistence in the wool fiber of fleece-bearing animals.

Accordingly, the invention provides an insect parasiticidal composition for the control and elimination of insect parasites on animals, comprising as its active ingredient at least one member selected from the group consisting of organotin compounds.

Preferably, the organotin compounds are selected from the group of compounds having the general formula:

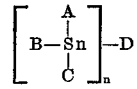

wherein A, B and C, which are the same or different, represent alkyl, aryl, mercaptide or hydroxyl groups, halogen atoms or acid radicals, D represents an acid radical, halogen or sulphur atom or mercaptide group and $n$ represents the integer 1 or 2; or when $n$ is 1, C and D may together represent an oxygen atom or D may represent the group:

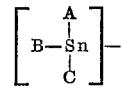

Preferably the term "alkyl" comprises 1 to 6 carbon atoms and the term "aryl" represents the "phenyl" radical.

As examples of the preferred organotin compounds of the above formula which may be used in the practice of this invention there may be mentioned triphenyltin acetate, triphenyltin hydroxide, triphenyltin chloride, triphenyltin tallate, tributyltin salicylate, tributyltin resinate, tributyltin neodecanoate, tributyltin undecylenate, bis(tributyltin) maleate, dimethyltin oxide, bis(trimethyltin) oxide, dimethyltin dichloride, dimethyltin bis dibutyl dithiocarbamate, dimethyltin bis lauryl mercaptide, dimethyltin bis isooctyl mercapto acetate, trimethyltin chloride, hexabutylditin, tributyltin laurate, butyltin dihydroxy chloride, tributyltin cyanate, tributyltin monochloro aceate, tributyltin p-amino benzoate, tributyltin dibutyldithio carbamate, triphenyltin phenyl mercaptide, trihexyltin chloride, triphenyltin salicylate, bis(tri-n-butyltin) oxide, tributyltin sulphide, tributyltin acetate, tripropyltin chloride, tributyltin-O-cresylate, tripropyltin acetate, triphenyltin acetate.

Especially preferred compounds according to this invention are the tributyltins and the trimethyltins and in particular bis(trimethyltin) oxide, tributyltin undecylenate, tributyltin p-amino benzoate, tributyltin neodecanoate, tributyltin salicylate and trimethyltin chloride.

In the treatment of the tick condition, the use of tributyltin undecylenate and tributyltin neodecanoate have been found particularly useful and efficaceous, whereas in the treatment of the blow fly or its larvae, the use of trimethyltin chloride is particularly preferred.

In practice, the compounds of the invention may be applied in the usual manner, for example, sprays, dips, washes in admixtures with carries and diluents. Moreover, since several of the compounds differ in their biological effect against different insect parasites, an advantage can accrue from the administration of a composition which contains more than one of the compounds of this invention.

The organotin compounds of this invention may be formulated as insecticidal compositions in the form of solutions, suspensions or dispersions in aqueous media containing suitable suspending or dispersing agents.

The invention also provides a process for controlling and eliminating insect parasites on animals which comprises the step of administering to the animal as a spray, dip or wash an insecticidal composition comprising any one or more of the compounds of the invention.

The formulations and insecticidal activities of the organotin compounds according to this invention are illustrated but not limited by the following examples:

EXAMPLE I

Sheep which were infected with lice of the *Damalinia ovis* species were treated with bis(tri-n-butyltin) oxide of graded concentrations and assessment of initial kill and also protective effect against re-infestation were noted.

Twenty-seven adult Merino and cross-bred sheep carrying moderate to heavy Damalinia burdens were used. Fleeces were 4"–6" long, and showed typical damage due to scratching and biting by the sheep.

The initial wash was made up in an 80-gallon capacity fibre-glass dipping tank, by the addition of premixed 67 fluid oz. of 95% bis(tri-n-butyltin) oxide and 67 fluid oz. of "Emulsifier T.B." to 80 gallons of water. This formed a stable white emulsion quite readily. Subsequent concentrations of bis(tri-n-butyltin) oxide were made by dilution of the wash after dipping of each group.

The following treatment groups were formed by random allocation of sheep.

| Group | Number of sheep | Treatment | Samples collected Before | After |
|---|---|---|---|---|
| I | 4 | Water only | | |
| II | 4 | 0.1 | 3 | 4 |
| III | 4 | 0.05 | 5 | 6 |
| IV | 4 | 0.01 | 7 | 8 |
| V | 7 | Untreated controls | | |

Sheep were treated individually, and immersed in the wash for 15 seconds each, with the head being immersed twice in this time. Treated sheep were held in open yards for 5 hours before being returned to a concrete-floored open-sided shed, where they were held for further observation.

Samples of wash were collected before and after the dipping of each of the bis(tri-n-butyltin) oxide groups, to determine whether any appreciable stripping of the active ingredient had occurred.

Sheep treated at the 0.05% and 0.01% levels showed some depression and oculo-nasal discharge in the two days following treatment, but soon returned to normal. Oedema around the head was present in the 0.05% group, but subsided after two days.

Bis(tri-n-butyltin) oxide at all concentrations tested, showed high efficiency in killing nymphal and adult lice and 24 hours after treatment, a few lice were present on the 0.01% group only, but after thorough examination of 7 days of treatment, no live lice were to be found.

EXAMPLE II

General procedure for testing activity against sheep blow fly

Serial dilutions of the test material in non-toxic volatile organic solvents for example acetone and chloroform are prepared. Measured quantities of these are placed on a small cotton wool pad in a flat-bottomed test tube. Tubes are left unplugged for 24 hours to permit evaporation of a solvent when 1 ml. of sheep or ox serum is added to the cotton wool pad. Small numbers of 1st instar larvae of the blow fly *Lucilia cuprina* are placed onto the pad. These larvae, normally 20–30 in number, are used within 24 hours of hatching from eggs. Tubes containing serum only, or known toxic compound are also set up as controls to check the system and viability of the larvae.

All tubes are lightly plugged and held in a temperature and humidity controlled room at 37° C. and 60 percent relative humidity. The tubes are examined in 24 hours and the development of the larvae non-toxic and toxic control tubes.

Subsequent to these initial trials varying concentration may be applied toxically to adult flies and thence formulated material may be applied to sheep to test activity and persistence.

Some typical results for tests against 1st instar *Lucilia cuprina* larvae are given below.

TABLE I

| Compound | Activity against 1st instar larvae *L. cuprina* in p.p.m. | | | | | | |
|---|---|---|---|---|---|---|---|
| | 1,000 | 100 | 10 | 5 | 2.5 | 1.2 | 0.25 |
| Tributyltin undecylenate | D | D | A | | | | |
| Tributyltin resinate | D | D | N | | | | |
| Tributyltin salicylate | D | D | A | N | N | N | |
| Tributyltin neodecanoate | D | D | N | N | N | N | |
| Tributyltin dibutyldithio carbamate | D | D | N | | | | |
| Tributyltin p amino benzoate | D | D | N | N | N | N | |
| Tributyltin monochloro acetate | D | D | N | | | | |
| Tributyltin cyanate | D | D | N | | | | |
| Tributyltin laurate | D | D | N | | | | |
| Triphenyltin salicylate | D | D | N | | | | |
| Triphenyltin phenyl mercaptide | D | D | A | N | N | N | |
| Triphenyltin acetate | D | D | N | | | | |
| Triphenyltin hydroxide | D | D | A | N | N | N | |
| Triphenyltin chloride | D | D | A | N | N | N | |
| Triphenyltin tallate | D | D | A | N | | | |
| Trihexyltin chloride | D | N | N | | | | |
| Trifethyltin chloride | D | D | D | D | D | D | D |
| Bis (tributyltin) maleate | D | D | A | N | N | N | |
| Hexabutylditin | D | D | A | N | N | N | |
| Dimethyltin bis lauryl mercaptide | D | A | N | | | | |
| Dimethyltin bis isooctyl mercapto acetate | D | D | N | | | | |
| Dimethyltin dichloride | A | N | N | | | | |
| Dimethyltin bis dibutyl dithiocarbamate | D | N | N | | | | |

Note.—D=dead; A=Affected; N=No effect; p.p.m.=Parts per million.

EXAMPLE III

General procedure for testing activity against the cattle tick—*Boophilus microplus*

Larvae, approximately 14 days old, were dipped for 4 minutes, using the ratio of 1 g. larvae to 5 ml. of suspension, containing the test material, after which they were dried and incubated at 30° C. and high humidity. Larvae were examined 24 hours after treatment. Death of larvae was assumed when no leg movements could be observed and larva masses separated freely on rotating the container.

The suspensions for dipping larvae were formed by dissolving the compound in ethanol containing a wetting agent for example Triton X–100 in such proportions to give, on dilution with water, suspensions containing 1 percent ethanol and 0.02 percent wetting agent. The suspensions were prepared just prior to use by adding 1 ml. of alcoholic suspension to 100 ml. of distilled water.

Similarly replete female ticks were dipped in varying concentrations of the compound prepared as suspensions above.

The $LG_{50}$ for larvae, i.e., the concentration required to kill 50 percent of the larvae treated, is determined from the results of dipping in serial concentrations of the test compound prepared as described previously.

The activity against susceptible and tolerant strains of *Boophilus microplus* was determined and the resistance factor calculated.

EXAMPLE IV

The $LG_{50}$ for larvae (*Boophilus microplus*) treated with several organotin compounds are as follows:

TABLE II

| Compound: | $LG_{50}$I Larvae, percent |
|---|---|
| Tributyltin laurate | .013 |
| Tributyltin sulphide | .0155 |
| Tributyltin acetate | .022 |
| Tripropyltin chloride | .025 |
| Tributyltin-O-cresylate | .028 |
| Tributyltin oxide | .033 |
| Tripropyltin acetate | .043 |
| Tripentyltin acetate | .048 |
| Triphenyltin chloride | 0.55 |
| Tributyltin neodecanoate | .0074 |
| Tributyltin undecylenate | .0052 |
| Tributyltin p-amino benzoate | .0059 |

EXAMPLE V

The resistance factor for *Boophilus microplus* larvae for a number of organotin compounds are as follows:

TABLE III

Resistance factor $GL_{50}E/LG_{50}Y$ 1.23
0.91
2.27
1.85
1.18
1.31
1.13
[1] 1.04
1.00

[1] Footnote appear after table in Example VI.
E = tolerant strain
Y = susceptible strain

EXAMPLE VI

The activity of certain organotin compounds against replete female ticks was as follows:

| Compound | Percent mortality at concentration | |
|---|---|---|
| | 0.1 percent | 0.03 percent |
| Tributyltin neodecanoate | 100 | 40 |
| Tributyltin undecylenate | 100 | 45 |
| Tributyltin salicylate | 100 | 88 |
| Tributyltin p-amino benzoate | 100 | 35 |
| Trihexyltin chloride | [1] 100 | [1] 85 |

[1] Although the ticks were not killed, oviposition was inhibited. All ticks dipped in suspensions of 0.1 percent failed to lay eggs while only 15 percent of those dipped in concentrations of 0.03 percent laid eggs. The viability of these eggs still remains to be determined.

I claim:

1. A method for controlling and eliminating insect parasites which live on the fleece or hide of domestic animals, comprising, applying to the fleece or hide of said animal an amount sufficient to control and eliminate said parasites of a parasiticidal composition comprising as the active ingredient at least one organotin compound having the general formula:

$$\left[ B-\underset{\underset{C}{|}}{\overset{\overset{A}{|}}{Sn}} -D \right]_n$$

wherein A, B and C, which are the same or different, represent an alkyl group having 1 to 6 carbon atoms, a phenyl group, a mercaptide, a hydroxide or a chloride and D represents acetate, tallate, salicylate, resinate, neodecanoate, undecylenate, maleate, carbamate, laurate, cyanate, benzoate, cresylate, chloride, sulfide or mercaptide and $n$ represents the integer 1 or 2; or when $n$ is 1, C and D may together represent an oxygen atom or D may represent the group:

$$\left[ B-\underset{\underset{C}{|}}{\overset{\overset{A}{|}}{Sn}} - \right]$$

where A, B and C have the meanings defined above.

2. A method in accordance with claim 1 wherein the insect is an animal tick and the organotin compound is at least one tributyltin compound.

3. A method in accordance with claim 2 wherein the tributyltin compound is selected from the group consisting of tributyltin undecylenate and tributyltin neodecanoate.

4. A method in accordance with claim 1 wherein the insects are blow flies or their larvae and the organotin compound is trimethyltin chloride.

5. A method in accordance with claim 1 wherein the organotin compound is selected from the group consisting of triphenyltin acetate, triphenyltin hydroxide, triphenyltin chloride, triphenyltin tallate, tributyltin salicylate, tributyltin resinate, tributyltin eodecanoate, tributyltin undecylenate, bis(tributyltin)maleate, dimethyltin oxide, bis (trimethyltin) oxide, dimethyltin dichloride, dimethyltin bis dibutyl dithiocarbamate, dimethyltin bis lauryl mercaptide, dimethyltin bis isooctyl mercapto acetate, trimethyltin chloride, hexabutylditin, tributyltin laurate, butyltin dihydroxy chloride, tributyltin cyanate, tributyltin monochloro acetate, tributyltin p-amino benzoate, tributyltin dibutyldithio carbamate, triphenyltin phenyl mercaptide, trihexyltin chloride, triphenyltin salicylate, bis (tri-n-butyltin) oxide, tributyltin sulphide, tributyltin acetate, tripropyltin chloride, tributyltin-O-cresylate, tripropyltin acetate, and tripentyltin acetate.

References Cited

UNITED STATES PATENTS

| | | | |
|---|---|---|---|
| 3,268,395 | 8/1966 | Taylor | 424—288 |
| 3,288,669 | 11/1966 | Hechenbleikner | 424—288 |
| 3,445,575 | 5/1969 | Taylor | 424—288 |
| 3,506,578 | 3/1970 | Karsten et al. | 424—288 |

SAM ROSEN, Primary Examiner